United States Patent [19]

Gavagan

[11] Patent Number: 4,788,630
[45] Date of Patent: Nov. 29, 1988

[54] ILLUMINATION FOR VEHICLE ACCESSORIES

[75] Inventor: James A. Gavagan, Centerline, Mich.

[73] Assignee: Irvin Industries, Inc., Rochester Hills, Mich.

[21] Appl. No.: 71,927

[22] Filed: Jul. 10, 1987

[51] Int. Cl.[4] .............................................. B60Q 3/02
[52] U.S. Cl. ...................................... 362/80; 362/61; 362/32
[58] Field of Search ...................... 362/32, 61, 74, 75, 362/90, 100, 152, 226, 80

[56] References Cited

U.S. PATENT DOCUMENTS

| | | | |
|---|---|---|---|
| 1,642,187 | 9/1927 | Young, Jr. | 362/32 X |
| 1,706,161 | 3/1929 | Hollnagel | 362/32 |
| 2,297,799 | 10/1942 | Pifer | 362/32 X |
| 2,561,756 | 7/1951 | Shook | 362/32 X |
| 3,270,191 | 8/1966 | Hilliard | 362/100 |
| 3,280,321 | 10/1966 | Overesch | 362/100 |
| 3,375,364 | 3/1968 | Marcus . | |
| 3,752,974 | 8/1973 | Baker et al. . | |
| 3,800,135 | 3/1974 | Ramsey | 362/32 |
| 4,163,883 | 8/1979 | Boulangeo | 362/32 X |
| 4,182,532 | 1/1980 | Walker, Sr. | 362/74 X |
| 4,467,402 | 8/1984 | Bauer et al. | 362/32 |
| 4,584,631 | 4/1986 | Cody et al. | 362/61 |
| 4,670,819 | 6/1987 | Boerema et al. | 362/80 |
| 4,686,609 | 8/1987 | Dykstra et al. | 362/61 |

Primary Examiner—Larry Jones
Attorney, Agent, or Firm—Harness, Dickey & Pierce

[57] ABSTRACT

A preferred illuminated vehicle accessory according to the present invention includes a light-emitting and light-conducting light bar, an electric light source operatively associated with the light bar, and an electrical connection device for electrically connecting the light source with a source of electrical current on the vehicle. The light bar is adapted to be interconnected with the vehicle accessory, and a light-directing apparatus is provided for directing the light emitted from the light bar toward at least one predetermined portion of the vehicle. The light bar preferably includes an elongated rod member composed of a light-conducting material, such as an acrylic material for example, that is at least semi-transparent. In various forms of the invention, the light bar can be located either on an internal surface of the vehicle accessory or on an exposed surface of the vehicle accessory.

22 Claims, 4 Drawing Sheets

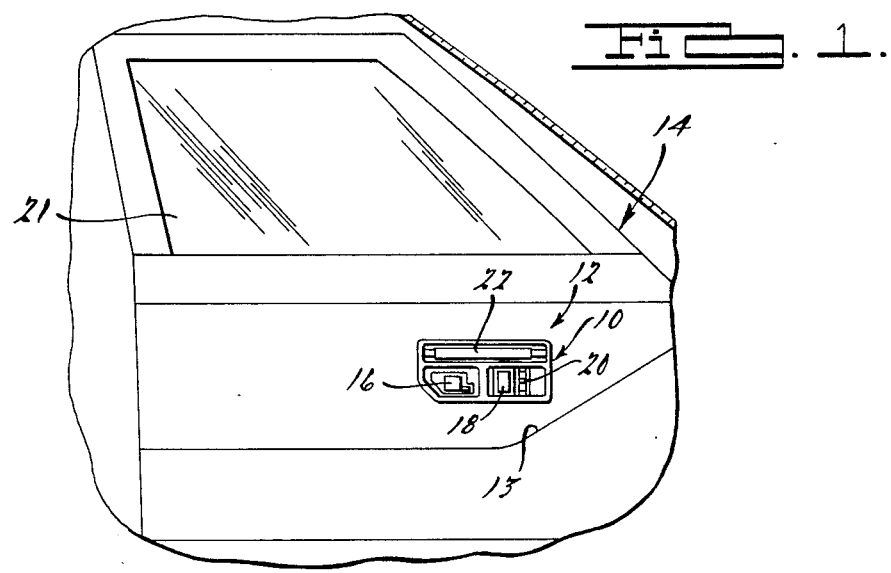
Fig. 1.
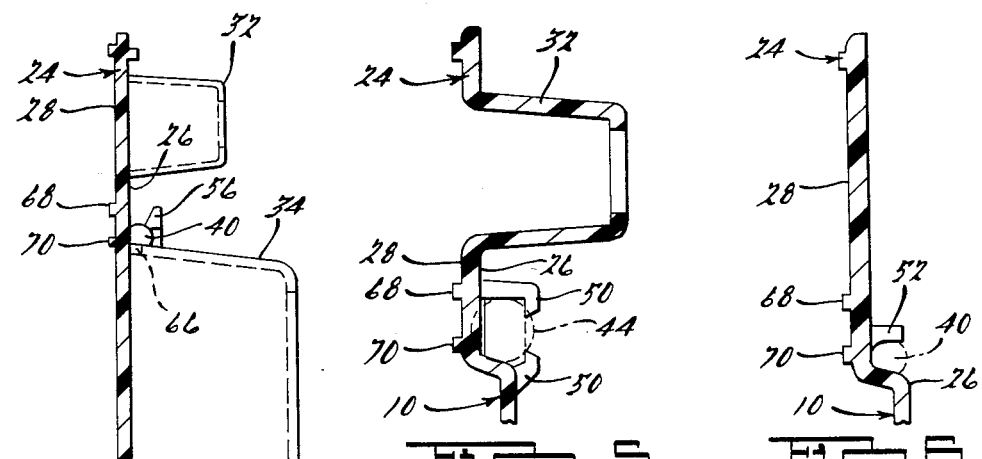
Fig. 5.  Fig. 6.
Fig. 4.
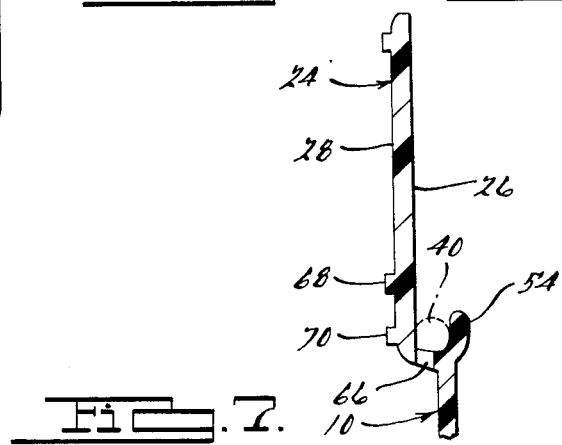
Fig. 7.

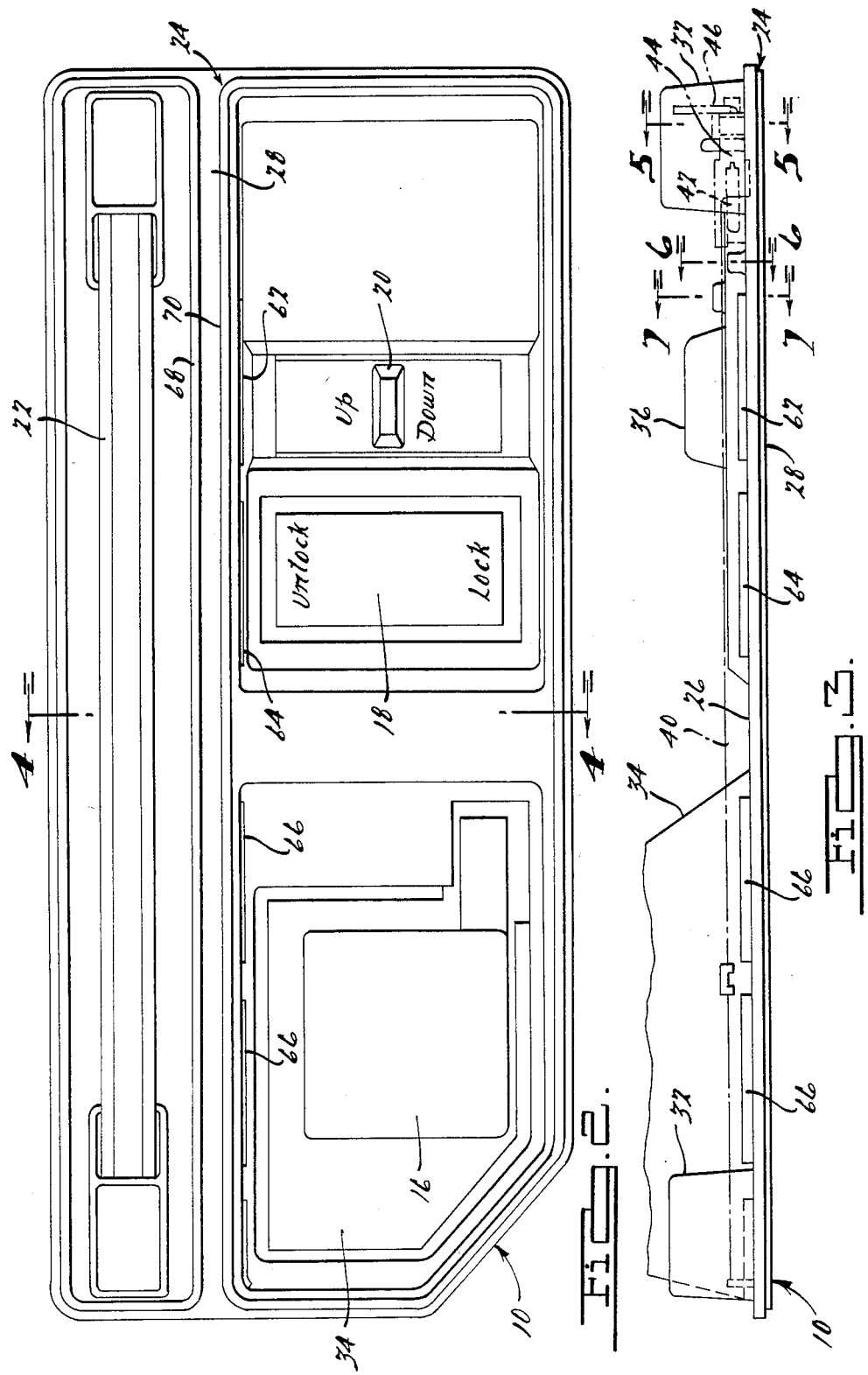

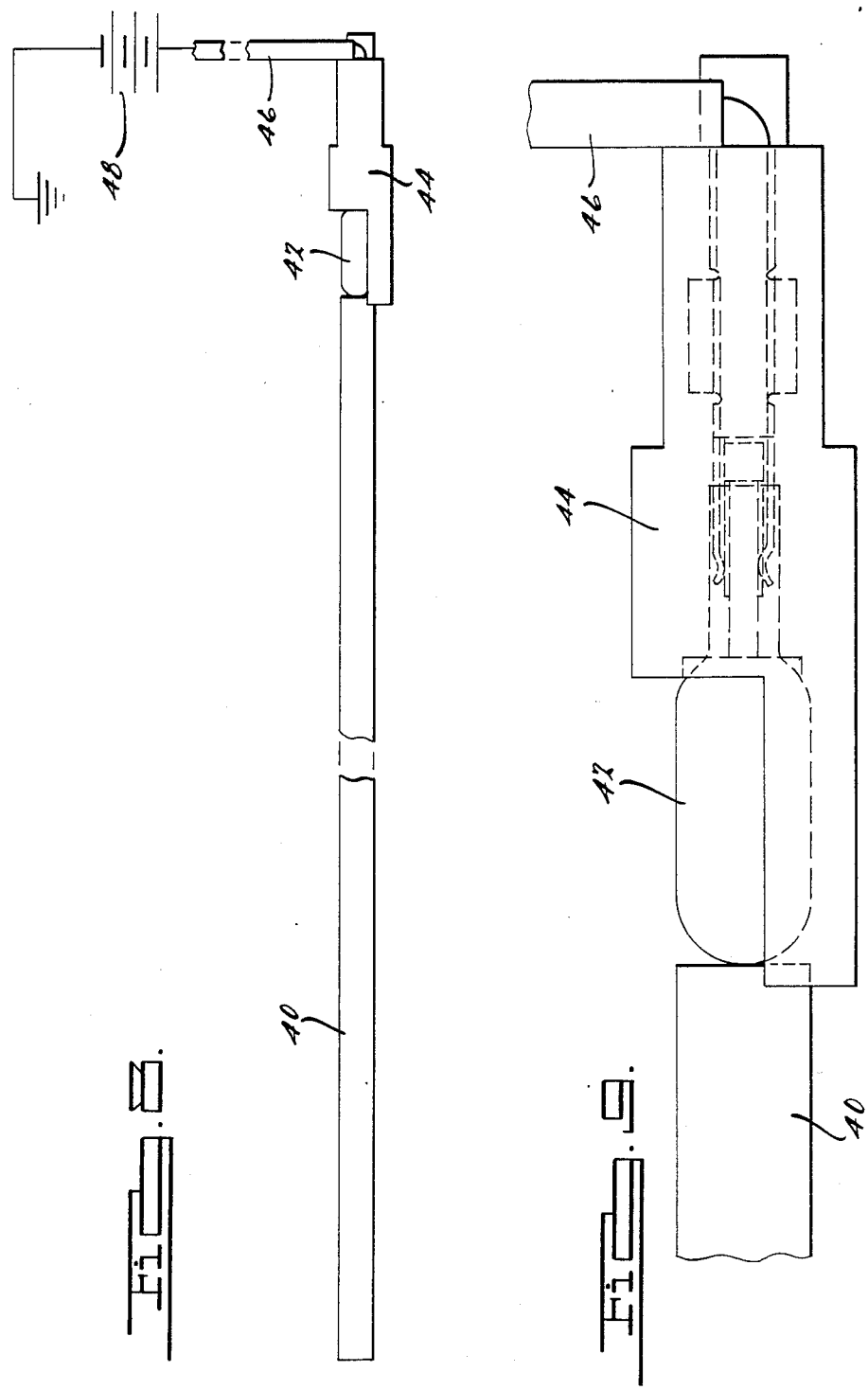

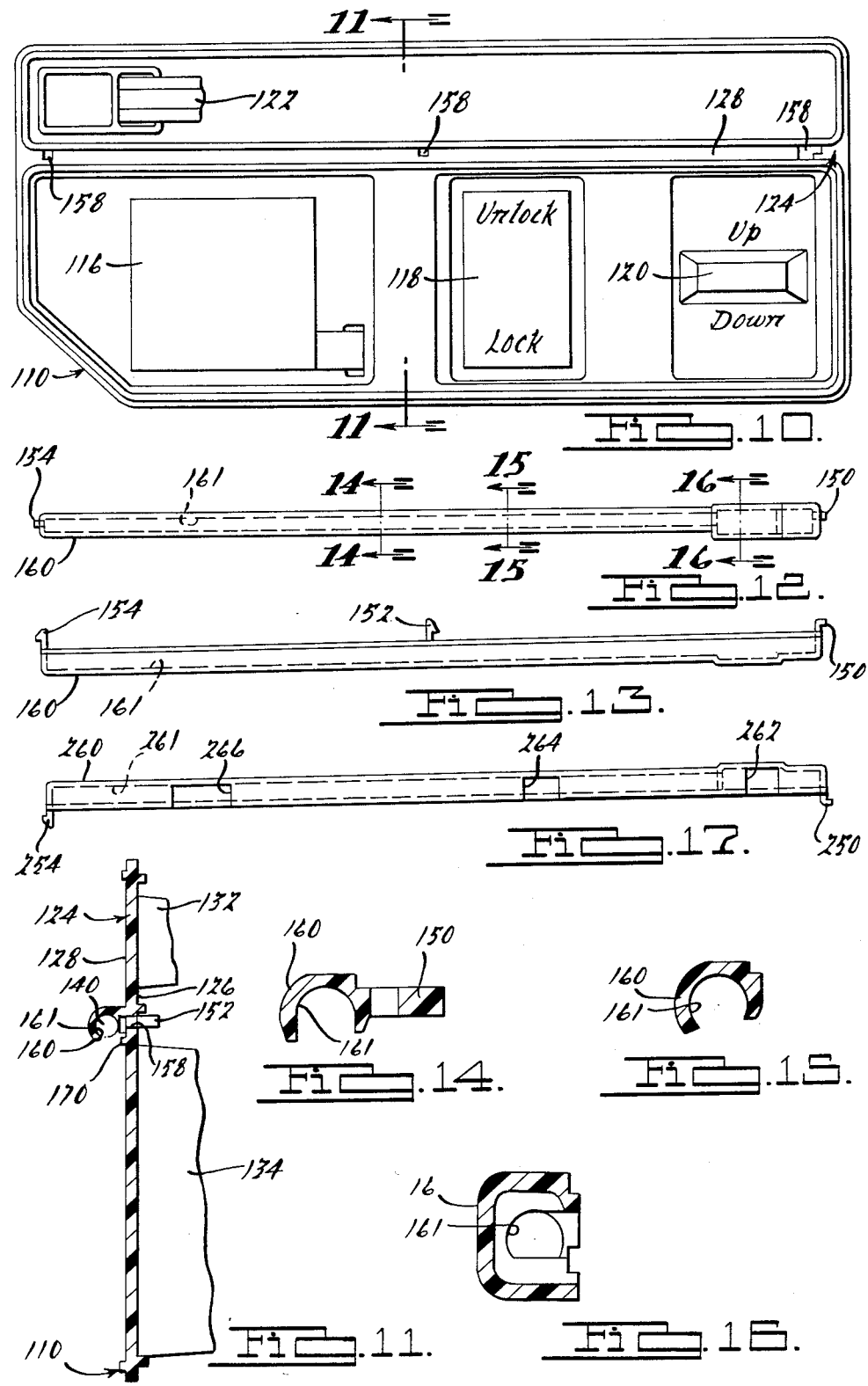

ILLUMINATION FOR VEHICLE ACCESSORIES

BACKGROUND AND SUMMARY OF THE INVENTION

The present invention relates generally to apparatus for illuminating vehicle accessories, and more particularly to such apparatus for selectively illuminating specific portions of a vehicle interior or exterior, such as vehicle controls, switches, and the like, on an interior vehicle panel, or other interior or exterior equipment.

Vehicle interiors typically include various vehicle accessories or vehicle interior panels having operating controls thereon. During nighttime driving, it is frequently difficult for the vehicle operator to locate and operate such controls without excessively diverting his or her attention from the roadway, unless some sort of inerior illumination is provided. However, excessive illumination such as that provided by dome interior lights, also tends to unduly interfere with the operator's attention to roadway conditions. As a result, various apparatuses or systems have been provided for illuminating such controls, including illumination devices housed in the control actuators themselves, for example. In addition, concentrated illumination devices, such as map lights and the like, have been provided with the light from the illumination device being concentrated on a specific area of the interior.

Although the above-mentioned types of illumination devices have helped alleviate these problems during nighttime driving, they are frequently inordinately complex or expensive to install in a vehicle interior, and in many instances have also been found to be distracting to the driver.

In accordance with the present invention, an illumination apparatus is provided for illuminating controls, switches, or other vehicle interior or exterior accessories, in which a relatively low level of illumination is provided at preselected specific locations in the vehicle interior, corresponding to the locations of the devices or areas desired to be illuminated. In addition, in accordance with a preferred form of the invention, such low-level illumination is provided by a relatively uncomplicated and inexpensive apparatus including a light-emitting and light-conducting light bar. Such light bar is preferably in the form of an acrylic fiber, rod or shaft that is interconnected with a panel or other portion of the vehicle interior, with the light from the light bar being directed toward the above-mentioned specific locations in the vehicle interior.

A preferred illuminated vehicle accessory according to the present invention includes the above-mentioned light-emitting and light-conducting light bar, an electric light source operatively associated with the light bar, and an electrical connection device for electrically connecting the light source with a source of electrical current on the vehicle. Suitable connecting means are provided for interconnecting the light bar with the vehicle accessory, and light-directing means are provided for directing the light emitted from the light bar toward at least one predetermined portion of the vehicle accessory. As mentioned above, the light bar preferably includes an elongated rod member composed of a light-conducting material, such as an acrylic material for example, that is at least semi-transparent.

In various forms of the present invention, the light bar can be located either on an internal surface of the vehicle accessory or on an exposed surface of the vehicle accessory. In one embodiment of the invention, the light bar is housed in an elongated housing having one or more openings therethrough for allowing the light emitted from the light bar to pass through to the vehicle interior, with the opening or openings being positioned generally adjacent the predetermined portions of the vehicle interior desired to be lighted. In other forms of the present invention, the light bar is secured directly to either an exposed or an internal surface of the vehicle accessory. Preferably, in any of the above-discussed forms of the present invention, the light bar is adapted to be connected to the vehicle accessory, or to an intermediate housing, in a resilient, snapped-on relationship therewith.

Additional objects, advantages and features of the present invention will become apparent from the following description and appended claims, taken in conjunction with the accompanying drawings.

BRIEF DESCRIPTION OF THE DRAWINGS

FIG. 1 is a partial elevational view of a vehicle interior, illustrating an exemplary application of the present invention for illuminating various preselected portions of an interior door panel.

FIG. 2 is an elevational view of the exemplary interior door panel of FIG. 1.

FIG. 3 is a top view of the exemplary interior door panel of FIGS. 1 and 2.

FIG. 4 is a cross-sectional view taken generally along line 4—4 of FIG. 2, but illustrating the interior door panel with the various vehicle controls or accessories removed.

FIG. 5 is a partial cross-sectional view, similar to that of FIG. 4, but taken generally along line 5—5 of FIG. 3.

FIG. 6 is a partial cross-sectional view, similar to that of FIG. 4, but taken generally along line 6—6 of FIG. 3.

FIG. 7 is a partial cross-sectional view, similar to that of FIG. 4, but taken generally along line 7—7 of FIG. 3.

FIG. 8 is a top view of the light bar, associated light source, and electrical connection apparatus for the interior door panel of FIGS. 1 through 7.

FIG. 9 is a detailed view of the light source and electrical connection apparatus of FIG. 8.

FIG. 10 is an elevational view, similar to that of FIG. 2, but illustrating an alternate embodiment of an interior door panel according to the present invention, shown with the operating devices or other vehicle accessories removed therefrom.

FIG. 11 is a cross-sectional view of the door panel of FIG. 10, taken generally along line 11—11 of FIG. 10.

FIG. 12 is an elevational view of an elongated housing for housing and retaining a light bar in the door panel of FIG. 10.

FIG. 13 is a top view of the elongated housing of FIG. 12.

FIG. 14 is a cross-sectional view taken generally along line 14—14 of FIG. 12.

FIG. 15 is a cross-sectional view taken generally along line 15—15 of FIG. 12.

FIG. 16 is a cross-sectional view taken generally along line 16—16 of FIG. 12.

FIG. 17 is a bottom view of a variation of the elongated housing illustrated in FIGS. 12 through 16.

DETAILED DESCRIPTION OF THE PREFERRED EMBODIMENTS

FIGS. 1 through 17 illustrate various exemplary embodiments of the present invention, providing an illumination system for a vehicle interior door panel or accessory panel. One skilled in the art will readily recognize from the following discussion, taken in conjunction with the accompanying drawings and claims, that the principles of the present invention are equally applicable to interior door panels other than those shown for purposes of illustration in the drawings, as well as to other vehicle accessories.

As illustrated in FIG. 1, an exemplary illuminated door panel 10 according to the present invention is adapted to be mounted on a door interior assembly 12 of a vehicle door 14. The exemplary illuminated door panel 10 typically includes a door handle 16, a lock switch 18, a window switch 20 for raising or lowering a vehicle window 21, a grab handle 22, or other such operating controls or accessories typically found in a vehicle interior. In addition the interior assembly 12 can be equipped with a shelf portion 13, which can also have various operating controls, switches, and the like, thereon.

As illustrated primarily in FIGS. 2 through 7, the door panel 10 preferably includes a panel 24 having an internal surface 26 and an opposite exposed surface 28. Various cavities, such as those indicated by reference numerals 32, 34, and 36, are provided in the panel 24 for housing various accessories or operating controls or actuators, or the mounting apparatus therefor, such as the grab handle 22, the door handle 16, and the window switch 20, for example.

In order to illuminate the various portions of the panel 24 corresponding to the locations of the door handle 16, the lock switch 18, and the window switch 20, or the various preselected portions of the interior assembly 12, a light-emitting light bar 40 is interconnected with the internal surface 26 of the panel 24. As shown in FIGS. 8 and 9, the preferred light bar 40 is of an elongated rod-like shape and is preferably composed of an acrylic material, or other suitable material that is at least semi-transparent and capable of conducting light. An electric lamp 42, or other suitable light source, is operatively associated with the light bar, preferably at one end thereof, and is retained by an electrical connector or lamp holder 44, with suitable electrical wiring 46 electrically interconnecting the lamp 42 with the vehicle's source of electrical source, which is diagrammatically represented by reference numeral 48 in FIG. 8.

The light bar 40, in the embodiment shown for purposes of illustration in FIGS. 1 through 9, is preferably interconnected with the internal surface 26 of the panel 24 by way of a number of generally hook-shaped connector members 52, 54, and 56. Similarly, the electrical connector 44 is also interconnected with the internal surface 26 of the panel 24 by hook-shaped connectors 50. The hook-shaped connectors 50, 52, 54, and 56, can optionally be integrally formed with the panel 24 on its internal surface 26, or can be separately formed as discrete connector members attached to the panel 24 by suitable means known to those skilled in the art. In order to simplify and reduce the cost of assembly and installation, the above-mentioned hook-shaped connectors 50 through 56 are preferably adapted to grippingly engage and receive the electrical connector 44 and the light bar 40, respectively, in a generally resilient, "snapped-on" or "snapped-in" relationship therewith.

In order to concentrate and direct the light emitted from the light bar 40 on preselected specific portions of the door panel 10, or the interior assembly 12 and the shelf portion 13, for purposes of illuminating the door handle 16, the lock switch 18, and the window switch 20, a number of openings 66, 64, and 62, respectively, are provided through generally adjacent portions of the panel 24. By such an arrangement, the light emitted from the light bar 40 is concentrated in, or generally restricted to, the areas of the door panel assembly 10 or the interior assembly 12 where illumination is needed in order to assist the operator of the vehicle in locating controls or accessories during nighttime driving. However, because of the relatively low level of illumination, and because such illumination is concentrated or restricted, the illumination is accomplished without excessively illuminating other portions of the door panel assembly 10 and thus providing discomfort or distraction for the vehicle operator.

One skilled in the art will readily recognize that in lieu of the discrete openings 62 through 66 mentioned above, a continuous elongated opening can alternately be provided in appropriate applications through the panel 24, in order to provide low-level illumination for a specific, but more continuous portion of the door panel 10 or the interior assembly 12, with a single opening replacing the openings 62 through 66 mentioned above, and sized and positioned to avoid the above-mentioned discomfort or distraction for the vehicle operator. It should also be noted that instead of mounting the light bar 40 on the internal surface 26 of the panel 24, the light bar 40 can alternately be located on, and attached directly to, the exposed surface 28 in a manner similar to that described above. In such an application, the light bar 40 would be preferably recessed into the exposed surface 28 and shielded by door panel trim portions, such as those indicated by reference numerals 68 and 70, for example, in order to focus and direct the light emitted from the light bar 40 on predetermined portions of the door panel 10 and for the interior assembly 12, without causing undesirable discomfort or distraction for the vehicle operator.

FIGS. 10 through 16 illustrate another exemplary embodiment of the present invention, wherein many components are generally similar to, or correspond with, many components of the embodiment illustrated in FIGS. 1 through 9. Accordingly, such corresponding components are indicated by reference numerals in FIGS. 10 through 17 that are one-hundred numerals higher than those of the corresponding components in FIGS. 1 through 9.

The illuminated door panel assembly 110 illustrated in FIGS. 10 through 17 is somewhat similar to the illuminated door panel 10 illustrated in FIGS. 1 through 9, except that the light bar 140 is housed within an elongated housing 160 that is interconnected with the panel 124 on its exposed surface 128. In this regard, it should be noted that the light bar 140 can alternately be retained and housed within a similar elongated housing structure that is alternately interconnected with the internal surface 126 in a manner generally similar to that described above for connecting the light bar 40 directly to the internal surface 26 in FIGS. 1 through 9.

The elongated housing 160 generally includes an internal open slot 161 running substantially along its entire length and adapted for receiving and retaining the light bar 140 and its associated light source apparatus (shown in FIGS. 8 and 9). The slot 161 also serves to direct the light emitted from the light bar along a specified, preselected area of the panel 124 in order to illuminate the various controls or other vehicle accessories. The elongated housing 160 also includes a number of hook-shaped connector portions 150, 152, and 154, which are adapted to be received in the connector receptacle openings 158 in the panel 124. Preferably, the connector portions 150 through 154 are resiliently received within the openings 158 in a generally "snapped-on" or "snapped-in" relationship with the panel 124.

In order to more individually illuminate controls or other accessory components, such as the door handle 116, the lock switch 118, and the window switch 120, for example, the elongated housing 160 can alternately be configured as shown in FIG. 17, wherein the elongated housing 260 is provided with a corresponding number of openings 262, 264, and 266, which are located along its lower or other surface that is generally adjacent the respective controls or components when the elongated housing 260 is snapped into place on the exposed surface 128 of the panel 124. By such an arrangement, the light emitted from the light bar 40 is more specifically concentrated and directed to the desired discrete locations on the illuminated door panel assembly 110 or other areas of the vehicle interior, without providing the above-discussed discomfort or distraction of the vehicle operator, but still providing low-level illumination to aid the operator in locating these controls or accessories in the vehicle interior.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. An illuminated vehicle interior accessory, comprising: a light-emitting light bar including an elongated rod member composed of a material that is at least semi-transparent; an electrical light source operatively associated with said light bar; means for electrically connecting said electrical light source with a source of electrical current on the vehicle; light bar connecting means for interconnecting said light bar with said vehicle interior accessory; and light-directing means for directing light emited from said light bar toward at least one predetermined portion of said vehicle interior in order to illuminate said predetermined portion of said vehicle interior, said elongated rod member being secured to an internal surface of said vehicle interior accessory, said vehicle interior accessory having at least one opening therethrough for allowing light emitted from said elongated rod member to pass through said opening, said opening being positioned generally adjacent said predetermined portion of said vehicle interior, said light bar connecting means including at least one generally hook-shaped connector member interconnected with said vehicle interior accessory, said hook-shaped connector member being adapted to engage said elongated rod member in a resilient snapped-on relationship therewith.

2. An illuminated vehicle interior accessory according to claim 1, wherein said opening in said vehicle interior accessory is a single elongated opening extending along a substantial portion of said vehicle interior assessory generally adjacent one or more of said predetermined vehicle interior portions.

3. An illuminated vehicle interior accessory according to claim 1, wherein said vehicle interior accessory includes a number of discrete openings spaced therealong, each of said discrete openings being positioned generally adjacent one or more of said predetermined vehicle interior portions.

4. An illuminated vehicle interior accessory according to claim 1, wherein said hook-shaped connector member is a discrete member formed separately from said vehicle interior accessory, said vehicle interior accessory having at least one hook-receiving opening therein for receiving a portion of said hook-shaped member in a resilient snapped-in relationship therewith.

5. An illuminated vehicle interior accessory according to claim 4, wherein said light bar connecting means includes a number of said hook-shaped connector members, and said vehicle interior accessory includes a corresponding number of hook-receiving openings therein.

6. An illuminated vehicle interior accessory according to claim 1, wherein said hook-shaped connector member is integrally formed on said internal surface of said vehicle interior accessory.

7. An illuminated vehicle interior accessory according to claim 1, wherein said light bar connecting means includes a number of said hook-shaped connector members.

8. An illuminated vehicle interior accessory according to claim 7, wherein each of said hook-shaped connector members is integrally formed on said internal surface of said vehicle interior accessory.

9. An illuminatd vehicle interior accessory according to claim 1, wherein said light-emitting light bar is recessed inwardly relative to the exposed surface of said vehicle interior accessory.

10. An illuminated vehicle interior door panel for installation on the interior of a vehicle door assembly, comprising: a light-emitting light bar including an elongated rod member composed of a material that is at least semi-transparent; an electrical light source operatively associated with said light bar; means for electrically connecting said electrical light source with a source of electrical current on the vehicle; light bar connecting means for interconnecting said said light bar with said door panel; and light-directing means for directing light emitted from said light bar toward at least one predetermined portion of said door panel in order to illuminate said predetermined door panel portion, said elongated rod member being secured to an internal surface of said door panel, said door panel having at least one opening therethrough for allowing light emitted from said elongated rod member to pass through said opening, said opening being positioned generally adjacent said predetermined door panel portion, said light bar connecting means including at least one generally hook-shaped connector member interconnected with said door panel, said hook-shaped connector member being adapted to engage said elongated rod member in a resilient snapped-on relationship therewith.

11. An illuminated interior door panel according to claim 10, wherein said material of said light bar is an acrylic material that is at least semi-transparent.

12. An illuminated interior door panel according to claim 10, wherein said opening in said door panel is a single elongated opening extending along a substantial portion of said door panel generally adjacent one or more of said predetermined door panel portions.

13. An illuminated interior door panel according to claim 10, wherein said door panel includes a number of discrete openings spaced therealong, each of said discrete openings being positioned generally adjacent one or more of said predetermined door panel portions.

14. An illuminated door panel according to claim 12, wherein said hook-shaped connector member is a discrete member formed separately from said door panel, said door panel having at least one hook-receiving opening therein for receiving a portion of said hook-shaped member in a resilient snapped-in relationship therewith.

15. An illuminated door panel according to claim 14, wherein said light bar connecting means includes a number of said hook-shaped connector members, and said door includes a corresponding number of hook-receiving openings therein.

16. An illuminated door panel according to claim 10, wherein said hook-shaped connector member is integrally formed on said internal surface of said door panel.

17. An illuminated door panel according to claim 10, wherein said light-emitting light bar is recessed inwardly relative to the exposed surface of said door panel.

18. An illuminated door panel according to claim 10, wherein said predetermined door panel portion includes vehicle operating controls thereon.

19. An illuminated door panel according to claim 10, wherein said predetermined door panel portion includes a door handle thereon.

20. An illuminated door panel according to claim 10, wherein said predetermined door panel portion includes operating controls thereon for selectively operating a door locking mechanism.

21. An illuminated door panel according to claim 10, wherein said predetermined door panel portion includes operating controls thereon for selectively operating a vehicle window opening and closing mechanism.

22. An illuminated door panel according to claim 10, wherein said predetermined door panel portion includes operating controls for selectively operating a vehicle accessory device.

* * * * *

UNITED STATES PATENT AND TRADEMARK OFFICE
CERTIFICATE OF CORRECTION

PATENT NO. : 4,788,630

DATED : November 29, 1988

INVENTOR(S) : James A. Gavagan

It is certified that error appears in the above-identified patent and that said Letters Patent is hereby corrected as shown below:

Column 1, line 18, "inerior" should be --interior--.

Column 5, line 50, Claim 1, "emited" should be --emitted--.

Column 6, line 34, Claim 9, "illuminatd" should be --illuminated--.

Column 7, line 8, Claim 14, "12" should be --10--.

Signed and Sealed this

Twelfth Day of January, 1993

Attest:

DOUGLAS B. COMER

Attesting Officer

Acting Commissioner of Patents and Trademarks